(12) United States Patent
Elliott

(10) Patent No.: US 10,724,678 B1
(45) Date of Patent: Jul. 28, 2020

(54) FAST FIT BRACKET ASSEMBLY

(71) Applicant: Kenney Manufacturing Company, Warwick, RI (US)

(72) Inventor: Timothy Elliott, Attleboro, MA (US)

(73) Assignee: Kenney Manufacturing Company, Warwick, RI (US)

( * ) Notice: Subject to any disclaimer, the term of this patent is extended or adjusted under 35 U.S.C. 154(b) by 0 days.

(21) Appl. No.: 16/556,968

(22) Filed: Aug. 30, 2019

(51) Int. Cl.
| | |
|---|---|
| *F16M 13/02* | (2006.01) |
| *F16B 9/02* | (2006.01) |
| *F16B 15/00* | (2006.01) |
| *A47K 10/12* | (2006.01) |
| *A47K 10/10* | (2006.01) |

(52) U.S. Cl.
CPC ............. *F16M 13/02* (2013.01); *A47K 10/10* (2013.01); *A47K 10/12* (2013.01); *A47K 2201/02* (2013.01); *F16B 9/02* (2013.01); *F16B 15/00* (2013.01)

(58) Field of Classification Search
CPC ........ F16M 13/02; A47K 10/10; A47K 10/12; A47K 2201/02; F16B 15/00; F16B 9/02
USPC ..... 248/447.1, 48.2, 497, 547, 216.1, 216.4, 248/217.2, 217.3, 475.1, 477, 496, 544
See application file for complete search history.

(56) References Cited

U.S. PATENT DOCUMENTS

| | | |
|---|---|---|
| 378,087 A | 2/1888 | Field |
| 827,627 A | 7/1906 | Graham |
| 917,601 A | 4/1909 | Heinrichs |
| 969,051 A | 8/1910 | Garraway et al. |
| 1,057,043 A | 3/1913 | Dohm |
| 1,147,355 A | 7/1915 | Zevin et al. |
| D60,744 S | 3/1922 | Weyman |
| D75,598 S | 3/1927 | Priest |
| D76,096 S | 8/1928 | Vermillion |
| D76,097 S | 8/1928 | Vermillion |
| 2,224,008 A | 12/1940 | Auslander |
| 2,679,373 A | 5/1954 | Henley |
| 2,859,879 A | 11/1958 | Rogers |
| 2,893,676 A * | 7/1959 | Connors ................ A47K 10/10 248/222.14 |
| 2,908,471 A | 10/1959 | McFerrell |
| 3,506,135 A | 4/1970 | Klingaman |
| 3,614,045 A | 10/1971 | Cegielski, Jr. |
| 3,669,395 A | 6/1972 | Gehrke |
| 3,912,211 A | 10/1975 | Topf |
| D244,668 S | 6/1977 | Tegner |
| 4,140,294 A | 2/1979 | Zwarts |
| 4,162,721 A | 7/1979 | Moriya |
| D259,241 S | 5/1981 | Lynch et al. |
| 4,325,528 A | 4/1982 | Martin |
| D265,285 S | 7/1982 | Englert, Jr. |

(Continued)

*Primary Examiner* — Muhammad Ijaz
(74) *Attorney, Agent, or Firm* — Adler, Pollock & Sheehan P.C.

(57) ABSTRACT

A bracket assembly includes a die struck metal plate, a molded plastic guide/nail set configured to fit over the die struck metal plate, the molded plastic guide/nail set including three spaced apart apertures, each of the apertures configured at an angle with respect to a central surface of the guide/nail set, the central surface comprising two upper opposing wings and a lower central wing configured to receive and secure an accessory, and common finish nails, the common finish nails used to secure the die struck metal plate and the molded plastic guide/nail set, when joined together, to a vertical surface.

9 Claims, 5 Drawing Sheets

(56) References Cited

U.S. PATENT DOCUMENTS

| | | |
|---|---|---|
| 4,381,578 A | 5/1983 | Glejf |
| D279,450 S | 7/1985 | Chap |
| 4,555,432 A | 11/1985 | Bossons |
| D281,575 S | 12/1985 | Chap |
| D285,410 S | 9/1986 | Webber |
| 4,662,593 A * | 5/1987 | Shames .................. A47K 10/10 248/201 |
| D290,224 S | 6/1987 | Skinner |
| D290,931 S | 7/1987 | Powell |
| 4,684,095 A | 8/1987 | Athey |
| 4,898,409 A | 2/1990 | Carter |
| D307,539 S | 5/1990 | Goodman et al. |
| D315,862 S | 4/1991 | Specker, Jr. |
| D316,031 S | 4/1991 | Goodman et al. |
| 5,011,030 A | 4/1991 | Alaurent |
| 5,069,412 A | 12/1991 | Jacob |
| D327,642 S | 7/1992 | Foubister |
| D329,372 S | 9/1992 | Wilms |
| D346,950 S | 5/1994 | Dunn et al. |
| 5,351,842 A | 10/1994 | Remmers |
| 5,549,407 A | 8/1996 | Levi et al. |
| 5,564,666 A | 10/1996 | Pfeil |
| 5,582,303 A | 12/1996 | Sloan |
| D389,035 S | 1/1998 | Smiley et al. |
| 6,216,889 B1 | 4/2001 | Chang |
| D455,334 S | 4/2002 | Ivankovic |
| D459,978 S | 7/2002 | Hollinger |
| 6,439,520 B1 * | 8/2002 | Johnson .................. A47G 1/22 248/218.1 |
| 6,695,276 B2 * | 2/2004 | Skorka .................. A47G 1/20 248/217.1 |
| D511,088 S | 11/2005 | Chiu |
| D517,402 S | 3/2006 | Cairns |
| 7,128,124 B2 | 10/2006 | Bibby et al. |
| 7,198,088 B2 | 4/2007 | McMenamin et al. |
| 7,287,734 B2 | 10/2007 | Bell |
| 7,370,839 B2 | 5/2008 | Putman |
| 7,497,028 B2 * | 3/2009 | Nevers .................. A47G 1/1606 33/613 |
| D591,143 S | 4/2009 | Ernst et al. |
| D605,931 S | 12/2009 | Piersant |
| D605,932 S | 12/2009 | Piersant |
| D622,578 S | 8/2010 | Kollman |
| 7,798,463 B2 * | 9/2010 | Morgenroth ........... A47G 1/164 211/106.01 |
| D632,951 S | 2/2011 | McGreevy et al. |
| 8,056,873 B1 | 11/2011 | Hanley et al. |
| 8,231,093 B2 | 7/2012 | Tran |
| D678,754 S | 3/2013 | Burr |
| 8,418,975 B1 | 4/2013 | Burr |
| 8,500,078 B2 | 8/2013 | Castellanos |
| D700,827 S | 3/2014 | Starck |
| 8,678,068 B1 | 3/2014 | Hobart et al. |
| D707,535 S | 6/2014 | Burr |
| 8,740,171 B2 | 6/2014 | Crescenzo |
| 8,814,114 B2 | 8/2014 | Baines |
| D714,622 S | 10/2014 | Pan |
| D715,133 S | 10/2014 | Pan |
| D715,625 S | 10/2014 | Pan |
| D715,626 S | 10/2014 | Pan |
| 8,851,435 B1 | 10/2014 | Bastien et al. |
| 8,925,747 B1 | 1/2015 | Hanley |
| D742,726 S | 11/2015 | Glass et al. |
| D760,068 S | 6/2016 | Sehl |
| 9,388,837 B1 | 7/2016 | Hanley |
| D767,378 S | 9/2016 | Sehl |
| 9,609,974 B2 | 4/2017 | Mateer |
| 9,687,092 B2 * | 6/2017 | Cabanes .............. A47G 1/1606 |
| D808,779 S | 1/2018 | Shoenhair et al. |
| D858,259 S * | 9/2019 | Hanley .......................... D8/363 |
| D858,260 S * | 9/2019 | Hanley .......................... D8/363 |
| 2005/0000716 A1 * | 1/2005 | Halbert .................... H02G 3/20 174/50 |
| 2006/0021722 A1 | 2/2006 | Mien Leslie |
| 2006/0054288 A1 | 3/2006 | Bibby et al. |
| 2007/0090244 A1 | 4/2007 | Goldstein |
| 2007/0125923 A1 * | 6/2007 | Wong .................. F16M 11/041 248/315 |
| 2007/0186384 A1 * | 8/2007 | Broehl ................ A47G 1/1613 16/355 |
| 2008/0164393 A1 | 7/2008 | Hung |
| 2008/0210827 A1 | 9/2008 | Samelson |
| 2009/0032659 A1 | 2/2009 | Goldstein |
| 2011/0266404 A1 * | 11/2011 | Hsu ........................ A47K 10/18 248/222.14 |
| 2012/0119046 A1 * | 5/2012 | Hsu ........................ A47K 10/10 248/222.14 |
| 2012/0152872 A1 | 6/2012 | Didehvar |
| 2012/0261371 A1 | 10/2012 | Baines |
| 2012/0284914 A1 | 11/2012 | Bauer |
| 2013/0099080 A1 | 4/2013 | Baines |
| 2013/0292349 A1 | 11/2013 | Bucklew et al. |
| 2013/0341474 A1 | 12/2013 | Baines |
| 2014/0166603 A1 | 6/2014 | Baines |
| 2014/0374367 A1 | 12/2014 | Morel |
| 2015/0265086 A1 | 9/2015 | Hanley et al. |
| 2016/0242586 A1 | 8/2016 | Mateer |
| 2017/0071390 A1 | 3/2017 | Moss et al. |
| 2017/0079457 A1 | 3/2017 | Baines |
| 2017/0332818 A1 | 11/2017 | Jones |
| 2018/0098656 A1 | 4/2018 | Baines |

\* cited by examiner

FAST FIT BRACKET ASSEMBLY

BACKGROUND OF THE INVENTION

The present invention relates generally to brackets, and more particularly to a fast fit bracket assembly.

In general, a bracket is an overhanging member that projects from a structure (such as a wall) and is usually designed to support a vertical load or to strengthen an angle. There are a variety of brackets that are available on the market but none provide a fast and easy procedure for mounting hardware.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a bracket assembly including a die struck metal plate, a molded plastic guide/nail set configured to fit over the die struck metal plate, the molded plastic guide/nail set including three spaced apart apertures, each of the apertures configured at an angle with respect to a central surface of the guide/nail set, the central surface comprising two upper opposing wings and a lower central wing configured to receive and secure an accessory, and common finish nails, the common finish nails used to secure the die struck metal plate and the molded plastic guide/nail set, when joined together, to a vertical surface.

In another aspect, the invention features a method including providing a bracket assembly, the bracket assembly including a die struck metal plate and a molded plastic guide/nail set configured to fit over the die struck metal plate, the molded plastic guide/nail set including three spaced apart apertures, each of the apertures configured at an angle with respect to a central surface of the guide/nail set, the central surface comprising two upper opposing wings and a lower central wing configured to receive and secure an accessory, driving a first common finish nail into a lower aperture on the bracket assembly to fix and position the bracket assembly on a vertical surface, driving second and third common finishing nails downwardly and outwardly into spaced apart upper apertures of the bracket assembly, securing the bracket assembly to the vertical surface, and placing the accessory over the bracket assembly.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein.

DETAILED DESCRIPTION

Figure 1:
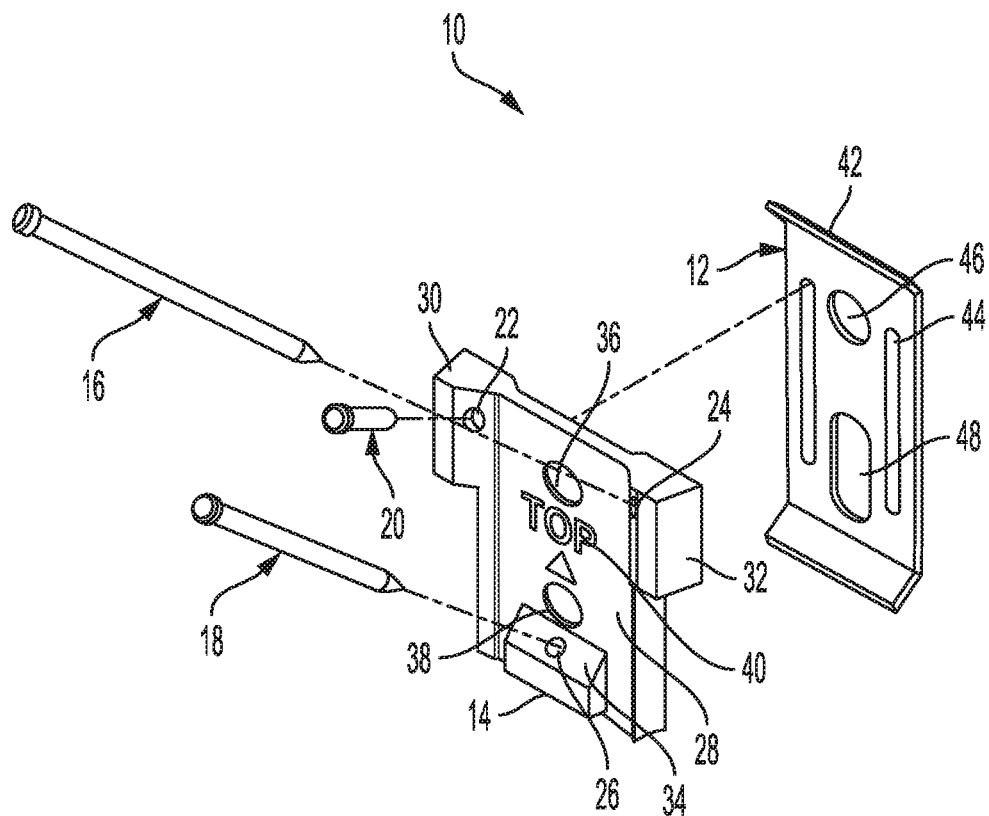
FIG. 1 illustrates an exemplary fast fit bracket assembly.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The fast fit bracket assembly of the present invention provides for a fast and easy procedure to mount hardware such as hooks, towel bars, towel rings, toilet paper rings, and so forth, to vertical surfaces such as drywall or wood, for example.

As shown in FIG. 1, an exemplary fast fit bracket assembly 10 includes a die struck metal plate 12, a molded plastic guide/nail set 14 and common finish nails 16, 18, 20. In this preferred embodiment common finish nails are used due to their small heads and there ability to be driven flush into the molded plastic guide/nail set 14, resulting in smooth finish and almost invisible nail and nail hole. Although common finish nails 16, 18, 20 are shown in this preferred embodiment, other fixating devices may be utilized, such as small screws.

The molded plastic guide/nail set 14 includes three apertures 22, 24, 26. Each of the apertures 22, 24, 26 are designed with an angle with respect to a central surface 28 of the guide/nail set 14. With this angled design, the common finish nails 16, 20 may be driven through the die struck metal plate 12 and vertical surface (not shown) at an outwardly and at a downward angle, while the common finish nails 18 may be driven downwardly. This orientation of the inserted common finish nails 16, 18, 20 provide a solid anchoring of the fast fit bracket assembly 10 to a vertical surface (not shown).

The central surface 28 of the guide/nail set 14 includes two upper opposing wings 30, 32 and a lower central wing 34. The wings 30, 32, 34 are configured to receive and secure an accessory (not shown), fully described below.

The central surface 28 of the guide/nail set 14 also includes two centrally positioned apertures 26, 38. In a preferred embodiment, a stencil 40 is included on the central surface 28 between the centrally positioned apertures 26, 38 and used to indicate a proper direction when the guide/nail set 14 and the die struck metal plate 12 are fit together.

The die struck metal plate 12 includes apertures 42, 44 that align with apertures 22, 24 when the guide/nail set 14 and the die struck metal plate 12 are fit together. The die struck metal plate 12 also includes two centrally positioned apertures 46, 48 that align with apertures 36, 38 when the guide/nail set 14 and the die struck metal plate 12 are fit together.

Figure 2:
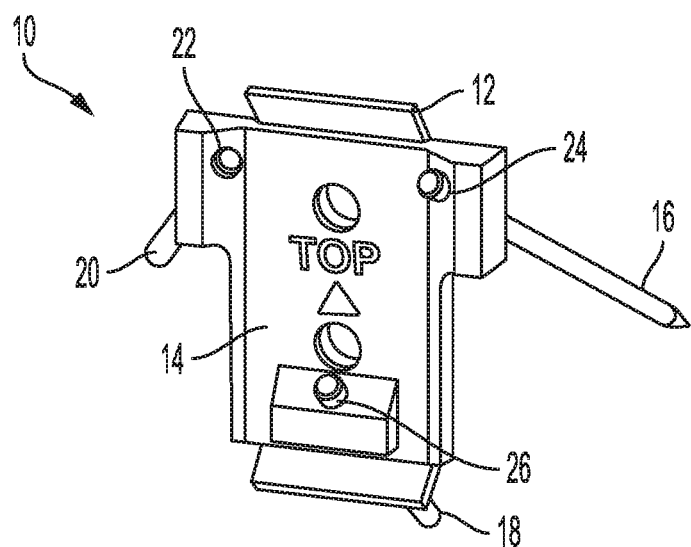
FIG. 2 illustrates an assembled fast fit bracket assembly.

In FIG. 2, the fast fit bracket assembly 10 is shown assembled. More specifically, the guide/nail set 14 and the die struck metal plate 12 are fit together and include common finish nails 16, 18, 20 positioned within the apertures 22, 24, 26.

Figure 3:
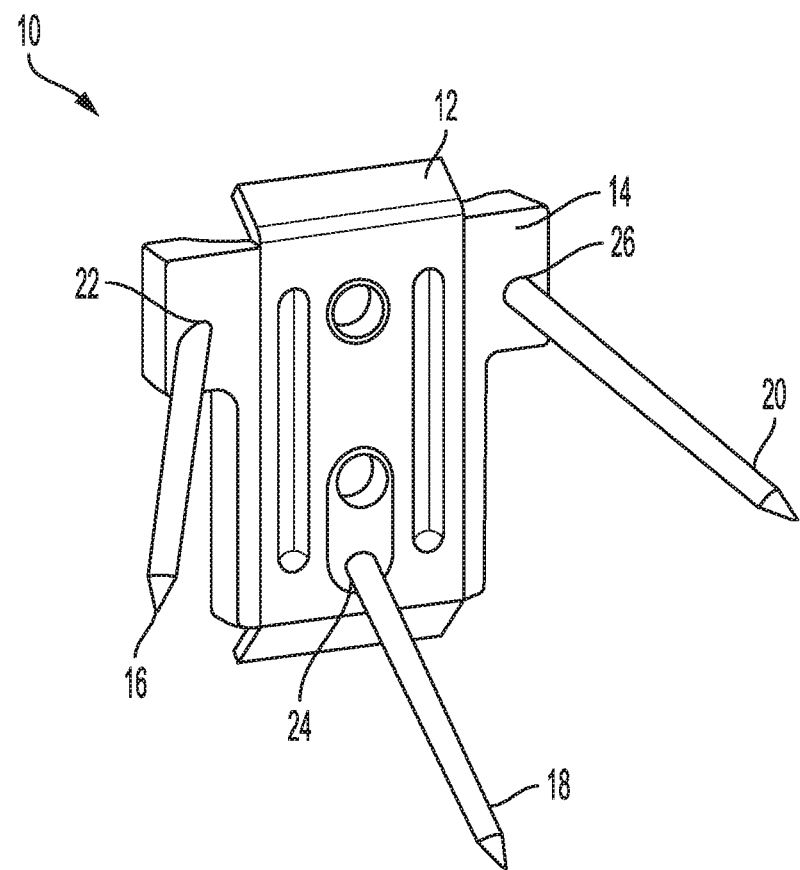
FIG. 3 illustrates a rear view of the fast fit bracket assembly.

In FIG. 3, a rear view of the fast fit bracket assembly 10 is shown fit together. More specifically, the guide/nail set 14 and the die struck metal plate 12 are fit together and include common finish nails 16, 18, 20 positioned within the apertures 22, 24, 26. As described above, when the fast fit bracket assembly 10 is shown assembled, the two centrally apertures 46, 48 are aligned with respective apertures 36, 38.

Figure 4:
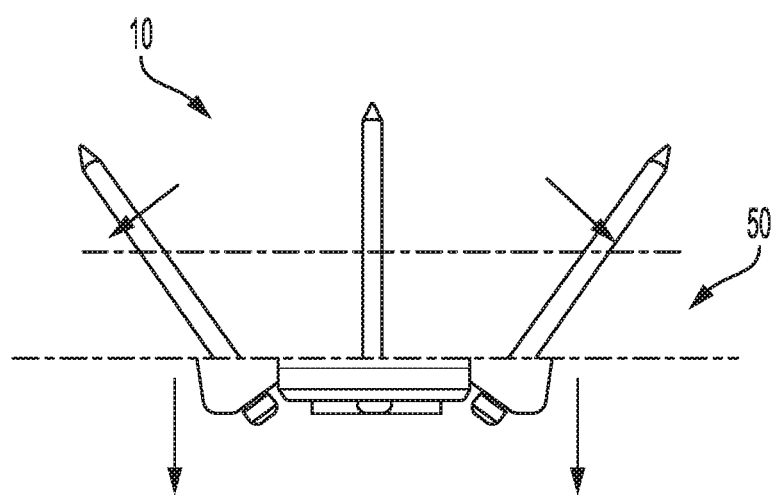
FIG. 4 illustrates a top view of the fast fit bracket assembly.

In FIG. 4, a top view of the fast fit bracket assembly 10 is shown assembled and attached to a vertical structure 50.

Figure 5:
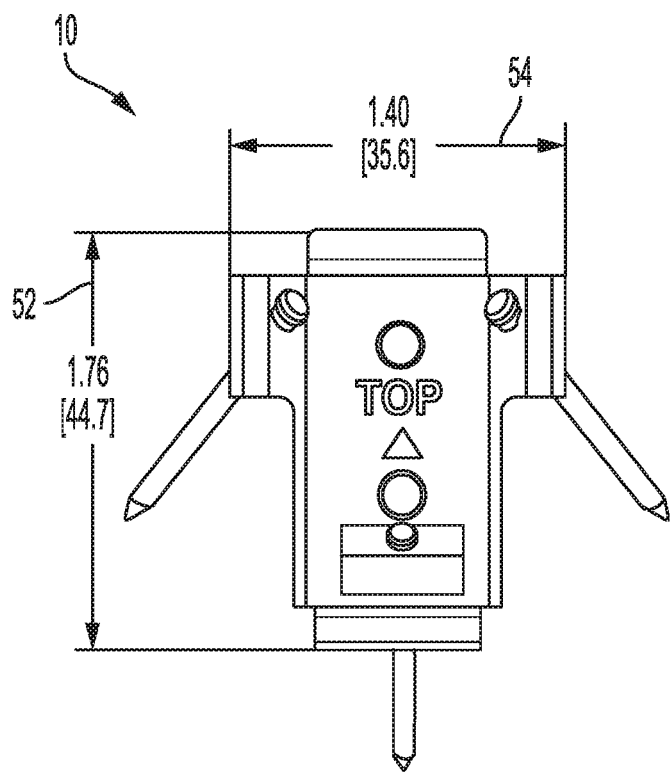
FIG. 5 illustrates a front view of the assembled fast fit bracket assembly.

In FIG. 5, a front view of the assembled fast fit bracket assembly 10 illustrates exemplary dimensions. Here, a overall height 52 is shown as 1.76 inches (44.7 mm) and an overall width 54 is 1.40 inches (35.6 mm).

Figure 6:
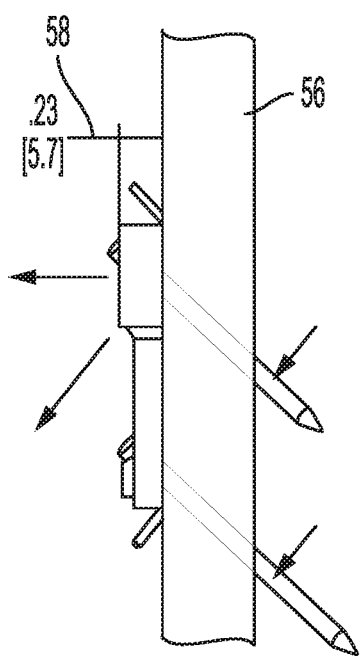
FIG. 6 illustrates a side view of the assembled fast fit bracket assembly.

In FIG. 6, a side view of the assembled fast fit bracket assembly 10 illustrates exemplary dimensions. Here, the assembled fast fit bracket assembly 10 is secured to a vertical structure 56 and has a depth 58 of 0.23 inches (5.7 mm).

Figure 7:
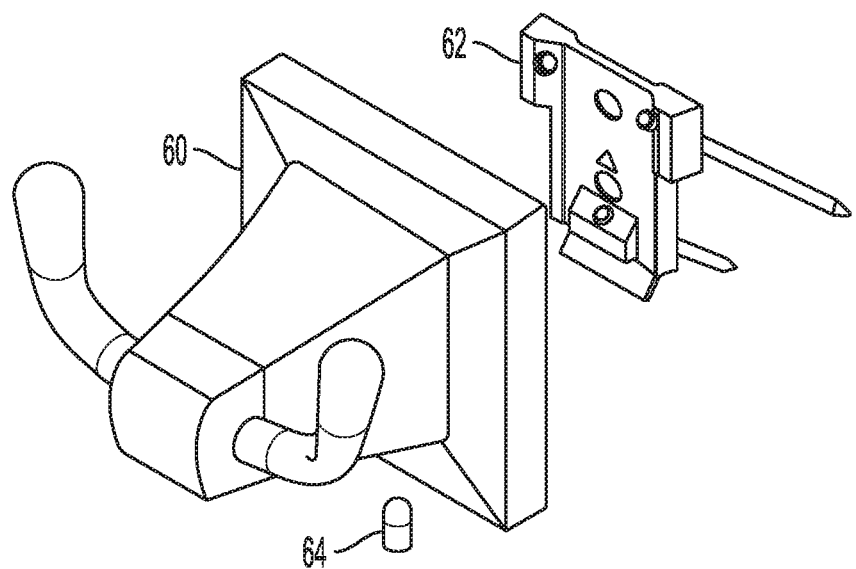
FIG. 7 illustrates an exemplary hardware accessory.

In FIG. 7, an exemplary hardware accessory 60 is shown in relationship to a fast fit bracket assembly 62. The fast fit bracket assembly 62 is placed onto the fast fit bracket assembly 62 and secured using a set screw 64.

Figure 8:
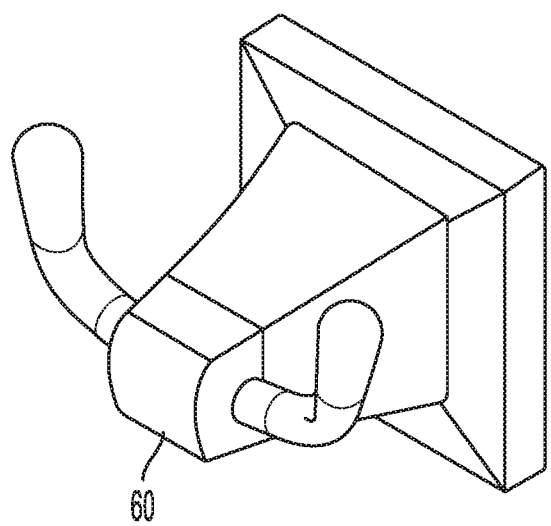
FIG. 8 illustrates an exemplary hardware accessory fitted over an assembled fast fit bracket assembly.

FIG. 8 illustrates the hardware accessory 60 positioned over the fast fit bracket assembly 62, which cannot be seen when the two are joined together.

Figure 9:
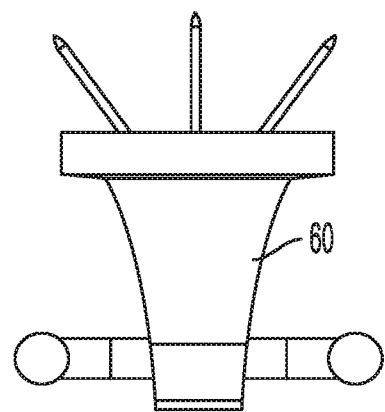
FIGS. 9 10 and 11 illustrate top, front and side views of the hardware accessory positioned over the fast fit bracket assembly.
Figure 10:
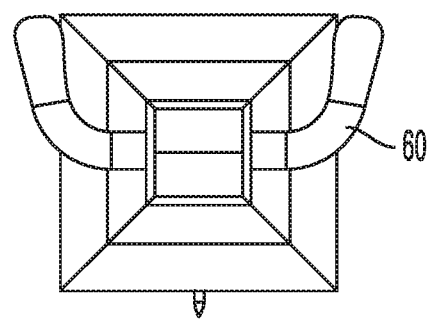
Figure 11:
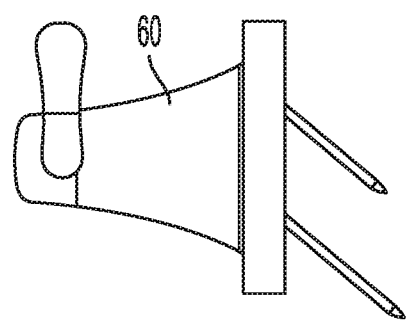

FIGS. 9, 10 and 11 illustrate top, front and side views, respectively, of the hardware accessory 60 positioned over the fast fit bracket assembly 62.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A bracket assembly comprises:
    a die struck metal plate;
    a molded plastic guide set configured to fit over the die struck metal plate, the molded plastic guide set including three spaced apart apertures, each of the apertures configured at an obtuse angle with respect to a central surface of the guide, the central surface comprising two upper opposing wings and a lower central wing configured to receive and secure an accessory; and
    common nails, the common nails used to secure the die struck metal plate and the molded plastic guide set, when joined together, to a vertical surface.

2. The bracket assembly of claim 1 wherein the obtuse angle enables the common nails to be driven through the die struck metal plate and vertical surface at an outwardly and at a downward angle, providing a solid anchoring to the vertical surface.

3. The bracket assembly of claim 1 wherein the accessory is selected from the group consisting of hooks, towel bars, towel rings, and toilet paper rings.

4. The bracket assembly of claim 1 wherein the vertical surface is a drywall surface.

5. The bracket assembly of claim 1 wherein the vertical surface is a wood surface.

6. The bracket assembly of claim 1 wherein a height of the die struck metal plate is 1.76 inches.

7. The bracket assembly of claim 1 wherein a width of a widest section of the molded plastic guide is 1.40 inches.

8. The bracket assembly of claim 1 wherein the accessory is secured to the molded plastic guide with a set screw.

9. A bracket assembly comprises:
    a die struck metal plate;
    a molded plastic guide set configured to fit over the die struck metal plate, the molded plastic guide set including three spaced apart apertures, each of the apertures configured at an obtuse angle with respect to a central surface of the molded plastic guide set, the central surface comprising two upper opposing wings and a lower central wing configured to receive and secure an accessory; and
    common nails, the common nails used to secure the die struck metal plate and the molded plastic guide set when joined together, to a vertical surface,
    the die struck metal plate including three apertures that are configured to align with the three apertures of the molded plastic guide set.

* * * * *